United States Patent [19]
Cowart

[11] Patent Number: 5,676,128
[45] Date of Patent: Oct. 14, 1997

[54] SOLAR DEVICE FOR COOKING OR STERILIZING AND METHOD OR USE THEREOF

[75] Inventor: Byron J. Cowart, San Diego, Calif.

[73] Assignee: Sun It Enterprises, San Diego, Calif.

[21] Appl. No.: 500,320

[22] Filed: Jul. 10, 1995

[51] Int. Cl.[6] .................................................. F24J 2/02
[52] U.S. Cl. ..................... 126/681; 126/657; 126/707; 126/708; 126/714
[58] Field of Search ............................... 126/652–657, 126/680–682, 707, 708, 714

[56] References Cited

U.S. PATENT DOCUMENTS

| | | |
|---|---|---|
| 4,043,318 | 8/1977 | Pei . |
| 4,114,186 | 9/1978 | Dominguez . |
| 4,232,655 | 11/1980 | Frissora et al. . |
| 4,238,247 | 12/1980 | Oster, Jr. . |
| 4,319,561 | 3/1982 | Pei . |
| 4,344,418 | 8/1982 | Leroy ............................ 126/652 |
| 4,399,808 | 8/1983 | Frissora et al. . |
| 4,416,257 | 11/1983 | Bale ............................... 126/652 |
| 4,429,952 | 2/1984 | Dominguez . |
| 4,442,828 | 4/1984 | Takeuchi et al. ............. 126/681 |
| 4,620,771 | 11/1986 | Dominguez . |
| 4,757,803 | 7/1988 | Dixon ........................... 126/652 |

*Primary Examiner*—Carroll B Dority
*Attorney, Agent, or Firm*—Brown, Martin, Haller & McClain

[57] ABSTRACT

A solar energy collector for cooking food or sterilizing liquids or articles is described, which may be fixed in place or portable. The device includes a heating (cooking or sterilization) chamber with a double-walled solar radiation concentrator with an outer transparent wall and an inner radiation absorptive wall, with the walls forming a space therebetween which is partially evacuated, means for retaining the food, liquid or articles within the chamber, an apertured casing attached to and surrounding the concentrator, and a support for the device. There may also be a radiation absorptive coating on the surface of the inner wall facing the evacuated space. Sunlight falling on the concentrator through the casing's aperture generates heat within the chamber to cook food or sterilze the liquid or articles. The device may be mounted on legs, a stand, wheels or moveable posts, or fitted with carrying straps or handles to be carried on hiking, riding or camping trips, for which its light weight and lack of need for fuel make it ideal, or on a vehicle such as a car or boat where it can operate while the vehicle is stationary or in motion. The collector may be tubular, dome-shaped, semicylindrical or other convenient shape, and is convenient made of glass or plastic or combinations thereof with each other or ceramic or metal. An internal or external reflector may be added to enhance the amount and effect of collected solar radiation.

34 Claims, 2 Drawing Sheets

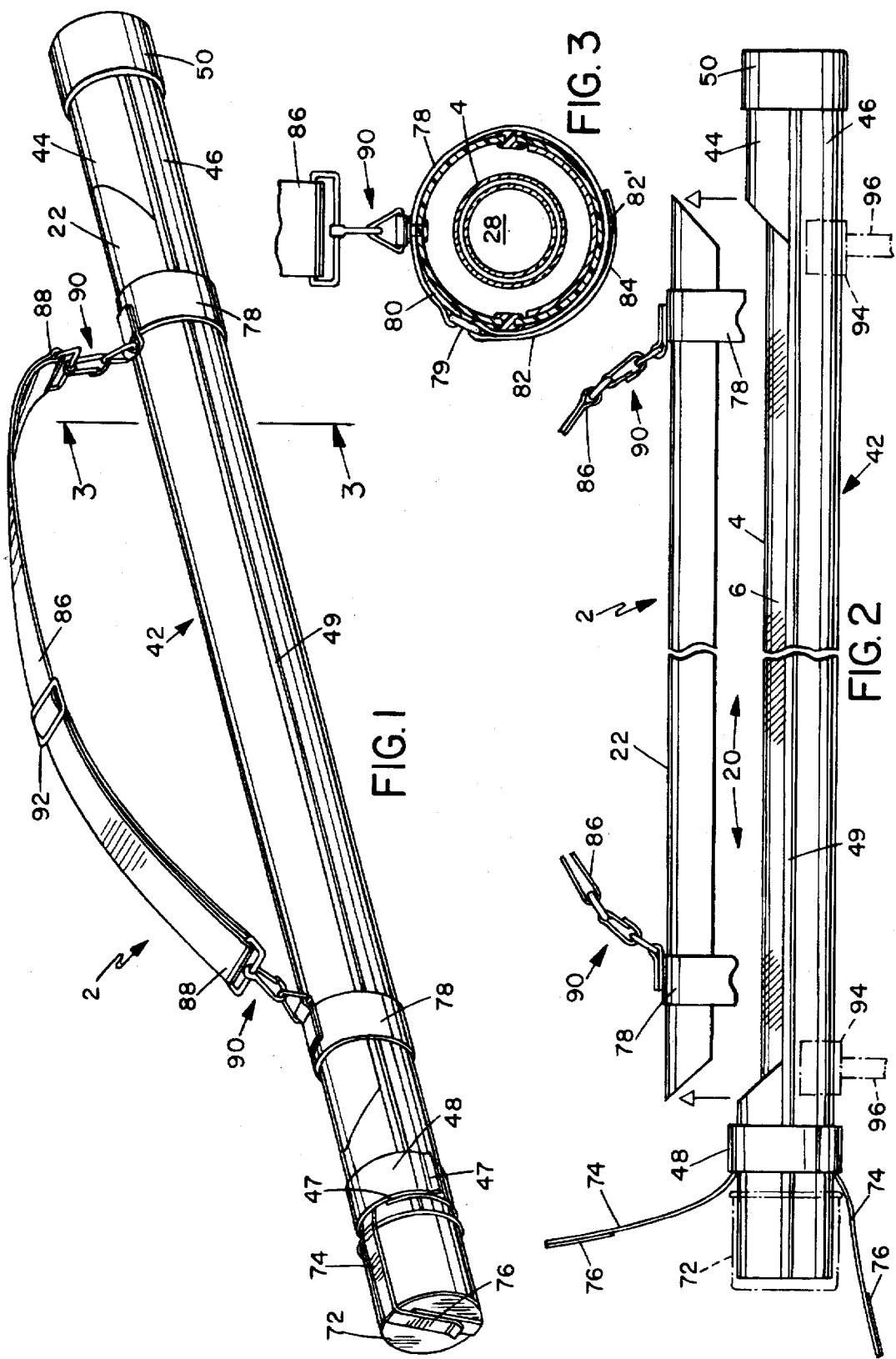

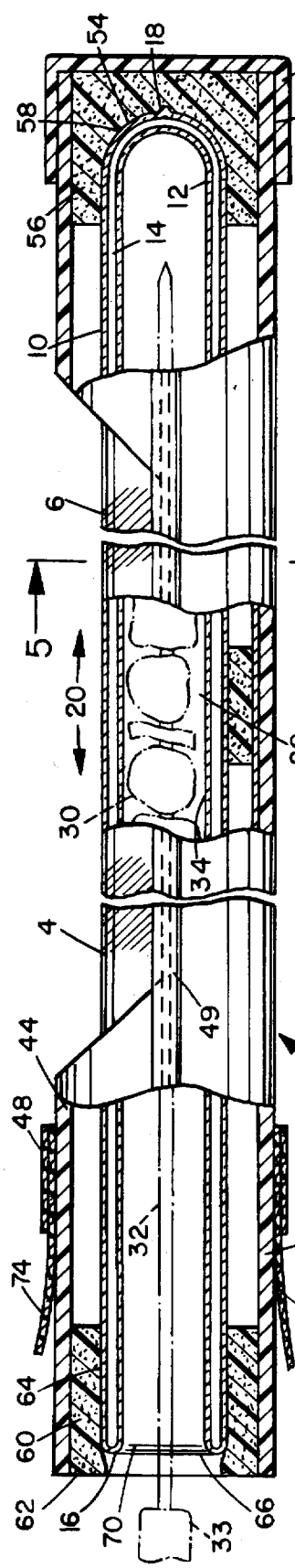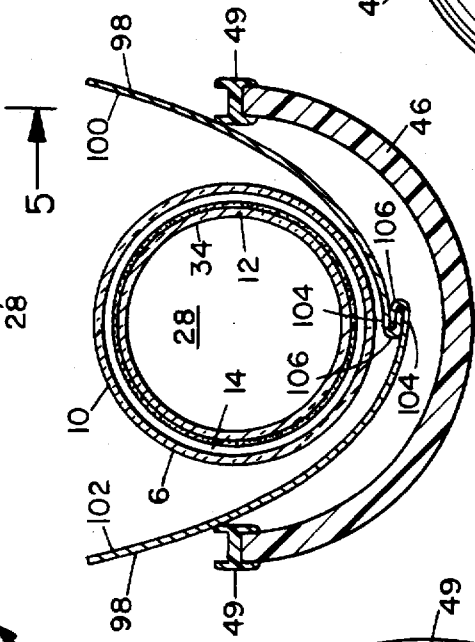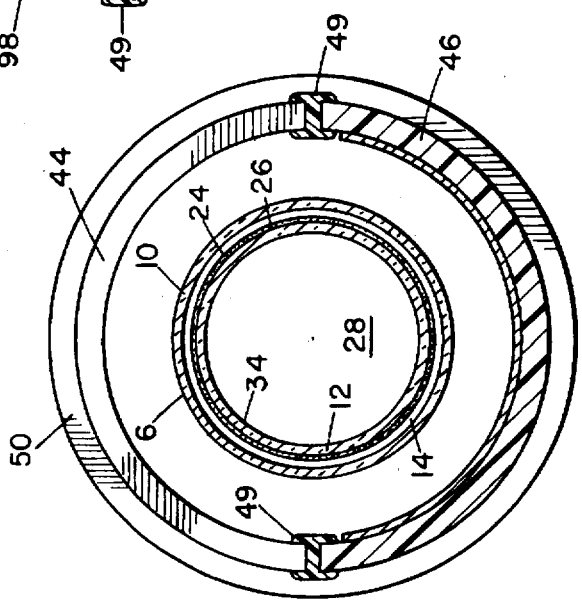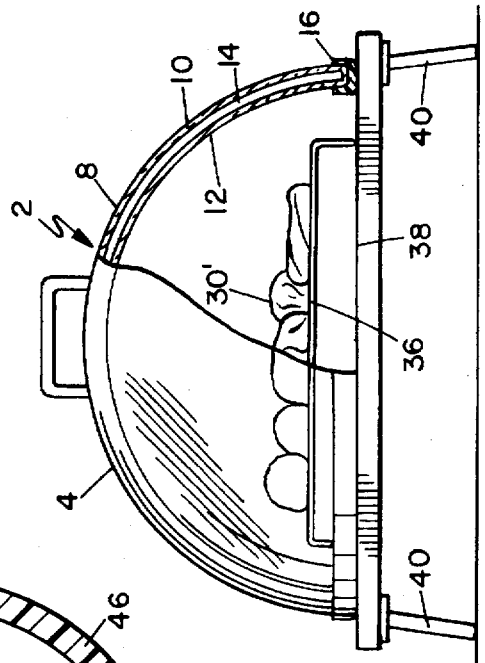
FIG. 4
FIG. 6
FIG. 7
FIG. 5

SOLAR DEVICE FOR COOKING OR STERILIZING AND METHOD OR USE THEREOF

BACKGROUND OF THE INVENTION

1. Field of the Invention

The invention herein relates to solar energy utilization. More particularly it relates to devices for cooking food or sterilizing water or medical or dental instruments using solar energy.

2. Description of the Prior Art

Solar energy collection devices are routinely used for heating of liquids and gases. There are, for instance, many solar heating devices for providing heat to buildings. In such devices a liquid, usually water, contained within a glass or other transparent tube is heated when the tube is exposed to sunlight. The heated water is then transported to a heat exchanger where it transfers some of the heat to the interior of the building. Solar heaters often consist of a number of such tubes linked by manifolds. Typical examples of such tubes and heater arrays are found in U.S. Pat. Nos. 4,043,318; 4,232,655; 4,238,247 and 4,399,808. Such devices, while efficient, are fixed arrays of a large plurality of tubes. They are not readily portable, nor can one effectively use a single tube individually.

Solar devices for cooking food have also been common. However, instead of heating liquids or gases to cook the food, such devices have normally consisted of mirrors or reflectors that collect and focus rays of sunlight on the food, which is positioned in front of or in the midst of such mirrors or reflectors. Polished metal sheets commonly serve as the mirrors or reflectors. Such devices may be fixed or portable. However, they are easily damaged and are difficult to use in the wind. In addition, they require the use of separate utensils for cooking.

SUMMARY OF THE INVENTION

The invention herein is a solar energy collector specifically designed for cooking food quickly, efficiently and without concern for wind effects. It may be structured as a fixed device or may be portable. As a fixed device, it may be used, for instance, to cook food on home patios or in grilles. As a portable device, it may readily be carried by hikers, campers, boaters, etc. and be used to cook food at campsites, on beaches or alongside trails. It may also be used indoors in locations where the solar radiation can be directed into the interior of a building without significant attenuation.

In one embodiment, the invention herein is a food cooking or sterilization device which comprises: a heating chamber at least partially enclosed by a solar radiation concentrator comprising a wall formed of a generally parallel spaced apart pair of sheets comprising an outer sheet transparent or translucent to solar radiation and an inner sheet opaque to and adsorptive of solar radiation, the sheets sealed together at their edges to form an enclosed space therebetween, the enclosed space being partially evacuated; retention means for retaining food, liquid or an article within the chamber, the retention means being removable from the chamber; a casing attached to and surrounding the concentrator, with an aperture therein; and orientation means for maintaining the device in a position such that solar radiation can impinge on the concentrator through the aperture; whereby the solar radiation impinging on the concentrator through the aperture generates heat within the chamber in a quantity sufficient to cook the food or sterilize the liquid or article within the chamber.

The device may be mounted on legs or a stand, and be fixed in place, or such device may be mounted on wheels, or be light enough to be lifted, and thus be "moveably fixed," since it can be moved from fixed site to fixed site. Alternatively, the device may be essentially portable, and fitted with carrying straps, handles, etc. to enable one to carry the device over the shoulder, attached to a backpack, strapped to a bicycle, etc. The device can thus be carried on hiking, riding or camping trips, or carried on a boat or to a picnic, and so forth. Its light weight and lack of need for fuel makes it ideal for camping or hiking trips, since its use allows hikers and campers to dispense with butane stoves and similar devices, along with the substantial quantities of fuel one must also carry. It is also contemplated that it may be used in some locations indoors, where solar radiation can be directed into the interior of a structure without undue attenuation.

The device is exemplified as having an elongated solar tube as its central component. However, as will be seen, other forms of solar energy collector, such as bowl-shaped units, may also be used.

In another embodiment, the invention comprises a method for cooking food utilizing solar radiation which comprises providing a cooking chamber at least partially enclosed by a solar radiation concentrator comprising a wall formed of a generally parallel spaced apart pair of sheets comprising an outer sheet transparent or translucent to solar radiation and an inner sheet opaque to and adsorptive of solar radiation, the sheets sealed together at their edges to form an enclosed space therebetween, the enclosed space being partially evacuated; providing food support means for supporting food within the chamber, the food support means being removably disposed within the chamber; providing a casing attached to and surrounding the concentrator, with an aperture therein; providing orientation means for maintaining the device in a position such that solar radiation can impinge on the concentrator through the aperture; placing food to be cooked on the support within the chamber; and maintaining the alignment such that solar radiation can impinge on the concentrator through the aperture and for a period of time sufficient for the solar radiation impinging on the concentrator through the aperture to generate heat within the chamber in a quantity sufficient to cook the food supported on the support means within the chamber.

In yet another embodiment, the invention is of a method for sterilization of a liquid or article utilizing solar radiation which comprises: providing a chamber adapted to function in the manner of an autoclave and at least partially enclosed by a solar radiation concentrator comprising a wall formed of a generally parallel spaced apart pair of sheets comprising an outer sheet transparent or translucent to solar radiation and an inner sheet opaque to and adsorptive of solar radiation, the sheets sealed together at their edges to form an enclosed space therebetween, the enclosed space being partially evacuated; providing retention means for retaining the liquid or article within the chamber; providing a casing attached to and surrounding the concentrator, with an aperture therein; providing orientation means for maintaining the device in a position such that solar radiation can impinge on the concentrator through the aperture; placing the liquid or article to be sterilzed within the chamber; and maintaining the alignment such that solar radiation can impinge on the concentrator through the aperture and for a period of time sufficient for the solar radiation impinging on the concentrator through the aperture to generate heat within the chamber in a quantity sufficient to sterilize the liquid or article within the chamber.

BRIEF DESCRIPTION OF THE DRAWINGS

FIG. 1 is a perspective view of one embodiment of the device of this invention, shown as a complete unit closed for carrying.

FIG. 2 is a side elevation view of the same embodiment, shown with the cover being removed for use.

FIG. 3 is an enlarged cross-sectional view taken on line 3—3 of FIG. 1.

FIG. 4 is an enlarged side elevation view with portions shown cut away to illustrate structural details and also to illustrate typical cooking operation.

FIG. 5 is an enlarged cross-sectional view taken on line 5—5 of FIG. 4 (with the cooking operation not shown).

FIG. 6 is a cross-sectional view similar to that of FIG. 5, showing an embodiment incorporating an extendible reflector.

FIG. 7 is a side elevation view, partially cut away, illustrating a domed embodiment of the invention.

DETAILED DESCRIPTION AND PREFERRED EMBODIMENTS

The invention will be best understood by reference to the drawings. A preferred embodiment of the device 2 is illustrated closed in FIG. 1, open in FIG. 2 and detailed in FIG. 4. The principal component is a double walled solar energy collector 4, which is shown as an elongated tube 6 in FIGS. 1–6 and as a dome 8 in FIG. 7. The collector 4 has an outer wall 10 and an inner wall 12, which are spaced apart and define an open volume or space 14 between them. The space 14 is preferably evacuated to a moderate vacuum, generally equivalent to the vacuum maintained in common commercial vacuum bottles or Dewar flasks. Evacuation of the space 14 avoids loss of solar energy arising from solar heating of the air which would otherwise be in the space.

In order for the tube 6 or dome 8 to be remain evacuated, of course, the walls 10 and 12 must be sealed together to form gas tight joints. Such will be seen as edge seals 16. Evacuation of the enclosed space 14 in the tube 6 is accomplished by leaving a small nipple 18 through which the air is evacuated, and which is then sealed as by heating to retain the moderate vacuum within the space 14. A similar nipple (not shown) may be used on the dome 8; either nipple may be subsequently reduced in size or blended into the walls if desired, such as for appearance or to avoid possible future damage.

The outer wall 10 of the tube 6 or dome 8 will be at least translucent, and preferably transparent, to sunlight, so that sunlight can penetrate through wall 10 into the interior of space 14 over that portion 20 of the tube 6 which is exposed when the cover 22 is removed. The entire outer wall 10 of the dome 8 will normally be exposed to sunlight, although without some type of reflector present, some portion of the dome 8 may be shaded, especially when the sun is low in the sky. The inner wall 12 of the tube 6 or dome 8 will be substantially opaque to solar radiation, and will have an absorptive coating 24 completely or partially covering that surface 26 of the inner wall 12 facing the space 14, as shown in FIG. 5. By "opaque" is meant that all or a significant portion of the solar radiation impinging on the collector is absorbed by wall 12 or coating 24. It will be recognized, however, that some wavelengths of radiation may penetrate to some degree through wall 12 or coating 24 and pass into chamber 28 and directly impinge on the food 30. The coating 26 adsorbs the solar radiation from the sunlight passing through outer wall 10 into the evacuated space 14 and re-emits thermal radiation into the cooking chamber 28 which forms the interior of the tube 6 or dome 8 and where the food 30 is placed. Conveniently the food pieces 30 are placed on a skewer 32, as shown in FIG. 4, which in turn may have a handle 33 or may be mounted for rotation in a rotisserie (not shown). The food 30 may also be inserted without any support, so that the food pieces merely rest on the inside surface 34 of inner wall 12, or they may be placed on any other type of narrow, elongated support sized to fit within the interior cavity 28. The food may be solid food, such as pieces of meat, sausages, small vegetables or pieces of larger vegetables, ears of corn, or the like. Liquids such as soup or slurry mixtures such as stew may also be put into the interior 28 of the tube 6 (although these latter liquid or partially liquid foods will of course not utilize skewers or other supports. The type and size of food 30 which may be cooked in the tube 6 will be limited primarily by the interior diameter of the tube 6. Limitations on food size will be much less in the cooking dome 8, because of the greater span of the dome 8. Food 30' may be larger items of meat, fish or vegetables, bowls of soup or stew, or complete potatoes, steaks, fish, etc. These will conveniently be supported on rack or platform 36 which in turn rests on bottom plate 38 of the domed cooker 2. The cooker may conveniently be mounted on legs 40 or other fixed or moveable supports (not shown) such as wheels, a post, a cart, etc.

The device 2 can also be used in the manner of an autoclave to sterilize water or medical or dental instruments. The water or instruments would be put into the chamber 28 in place of the food 30 and the device 2 then operated in the usual manner, with the solar radiation causing heating of the instruments or water to sterilzation temperatures. The device 2 may thus be used for field sterilization where conventional autoclaving equipment is not available.

In the elongated or tube embodiment shown in FIGS. 1–6, the tube 6 is surrounded by an elongated housing 42 which is illustrated as cylindrical. The housing 42 is conveniently formed as two semi-cylinders 44 and 46 as shown in FIG. 5, and which are secured by a collar or strap 48 at one end and a cap 50 at the other end. If desired they may easily be aligned over their lengths by the use of H-channels 49. Strap 48 may have a hook-and-loop closure (not shown) removably sealing its overlapping ends 47, or those ends 47 may be permanently sealed with an adhesive. The cap 50 is normally sealed in place, and is mounted on the end 52 of the device 2 which houses the sealed end 54 of the tube 6. Cap 50 may be mounted for removal by a slight interference fit with the end of the housing 42, or may be sealed in place by an adhesive. Inside cap 50 is a block 56 of polymeric foam or similar material into which is formed a recess 58 into which the sealed end 54 of the tube 6 is seated. The foam 56 retains and cushions the end 58 of the tube 6. A corresponding block 60 of foam is mounted at the other end 62 of the device 2; this block 60 has an aperture 64 entirely therethrough, into which the open end 66 of tube 6 is seated. The foam block 60 similarly retains and cushions open end 66 of the tube 6, but also permits access to the interior space 28 though the opening 70 in open end 66. Preferably the end 66 of tube 6 is recessed slightly in aperture 64 as shown in FIG. 4 to protect against potential damage.

The open end 66 of device 2 will be covered or plugged in some manner to protect the tube 6 and to maintain the cleanliness and sanitation of the interior chamber 28. A preferred cover is cup 72, which is removed by merely sliding it off the end 66 of tube 6. When separated it may be used as a beverage container, soup bowl, etc. It will be held in place by straps 74 which have corresponding hook-andloop fastener strips 76, which close over the bottom of the cup 72 when the latter is mounted on the end 66 of the device 2. The cup 72 may remain in place during cooking, if desired, since it does not fit so tightly that there is unwanted pressure buildup within the chamber 28 during cooking. If a plug, such as a screw plug of the type used with coffee urns, is used at the end 66 it should be fitted such that it either contains pressure relief means or can be slightly loosen in use to allow pressure relief. Alternatively, one can use a tightly fitting plug or cap, and allow some pressure buildup above ambient within the chamber 28, so that the device works as a solar pressure cooker. The elevated pressure would of course have to be less than that which would pose a risk of fracture of the tube walls, although if one wanted to use substantial pressure this could be accommodated by use of relatively thick walls 10 and 12 for the tube 6. It is also known that cylindrical structures can withstand substantial internal pressure.

A substantial mid-section of semi-cylinder is removable as cover 22, to permit sunlight access to the tube 6. Cover 22 is retained in place when the device 2 is closed by straps 78. In a preferred embodiment, each strap 78 has one end 78 mounted to a metal ring 79 and an opposite end 82 which loops through the ring 79 and is secured to its extremity 82' by a hook-and-loop fastener 84. The tightness of straps 78 around the housing 42 securing cover 22 may then be adjusted by the user. In the embodiment shown in FIGS. 1–3, which is intended to be readily portable, a carrying strap 86 is attached at its ends 88 to straps 78 by conventional loop and separable mounting clip assemblies 90. Strap 86 preferably also includes slide 92 to allow length adjustment to accommodate carrying by different persons or attachment to other camping or hiking gear.

While the embodiment of FIGS. 1–3 is shown in its portable configuration, it can be fixed in place by mounting on brackets 94. Brackets 94 in turn can be mounted on legs or posts 96, which can be fixed in place as on a patio or deck or can be sharpened or pointed on their other ends for driving into the ground, as at a campsite or picnic ground. The latter type of post/bracket are of course used primarily when the device is taken on outdoor trips for hiking, camping, etc., and can easily be carrier along with the device 2. Conveniently one could attach additional straps (not shown) to the device 2 to secure the posts 96 to the outside of the housing 42 for transport.

In yet another and unique application, the device 2 of this invention can be mounted on a vehicle such as boat or car, and can be operated while the vehicle is stationary or in motion. Thus one can cook food while traveling in a car or on a boat, a function never before possible with any prior art cooking or heating devices.

Alternatively, the device may be supported in position by means at hand, rather than relying on posts, stands, etc. On a camping trip, for example, one could support the device against rocks, shrubs or tree limbs, or at a residence it could be supported against a fence, wall, or merely laid on a substrate such as a table with the aperture facing generally upward; it could be braced against rolling by any convenient blocks, tableware, etc. if necessary. The only requirement is that the support (which can be a supporting substrate) allow the device to maintain an orientation to the sun that allows an adequate portion of sunlight to pass through the tube 6 or dome 8 to cook the food inside and to retain the food in a suitable position inside the device.

While the device of this invention will clearly find its principal uses out of doors, it is possible for it to be used indoors within the interior of a building or other structure if solar radiation can be directed into that interior without undue attenuation. For instance, there are commercial devices which are mounted on a building roof and reflect sunlight into the building through light wells disposed through the roof. These devices are commonly motorized to track the daily movement of the sun and maintain the maximum reflection of light through the wells throughout the day. Examples of such devices are illustrated in U.S. Pat. Nos. 4,114,186; 4,429,952 and 4,620,771. The device 2 of this invention would of course be positioned at the interior end of one such light well so that the reflected solar radiation could impinge directly onto the device 2 in the same manner as if the device 2 were located outside of the building.

The cooking efficiency of the device 2 may be enhanced by the incorporation of an internal extendible/retractable reflector 98 within the semi-cylinder 46 but outside the tube 6, as shown in FIG. 6. The reflector 98 is in two halves 100 and 102 which nest with each other when they are retraced into the housing 42. To prevent their undesired separation when extended, their interior elongated edges 104 are both formed into C-shaped rims 106 with interlock with each other when the halves 100 and 102 are extended, and limit how far the halves can be moved, as shown in FIG. 6. Alternatively, an exterior reflector (not shown) can be used, and simply mounted alongside, under or cradling the tube 6 or dome 8. The reflector, whether internal or external, may be made of polished metal, mirrored or metal coated glass or ceramic, metal foil or any similar reflective material which is sufficiently stiff to hold its position and effectively reflect solar radiation into the aperture 20.

The outer wall 10 of tube 6 and dome 8 may be made of any convenient rigid transparent (preferably) or translucent material, such as glass or hard plastic. Glass is normally preferred, since it not only withstands elevated temperatures but is also easy to clean and is inert to foods. High temperature resistant clear plastics such as polycarbonates and polysulfones may also be used. The inner wall 12 may also be made of glass or hard plastic, but since it will be opaque, it may also be made of metal or ceramic. The material of the inner wall 12 must be such that the adsorptive coating 24 will adhere satisfactorily. The materials of the walls 10 and 12 will be chosen such that they can be properly sealed or adhered together at their edges to maintain the desired degree of partial vacuum within the interior space 14. Conveniently both walls will be of the same material, and absorption of solar radiation will be principally by the coating 24. The coating 24 may be any convenient solar energy absorbing material which can be adhered to the surface 34 of wall 12. Suitable examples include dark colored paint, carbon black, dark colored ceramic coatings and the like. The housing 42 will commonly be made of plastic or metal, although a plastic is preferred since it is less likely to be dented or otherwise damaged during transport than is metal. Plastics are also likely to be lighter in weight and less expensive. Rigid foam plastics are particularly suitable. Stainless steel is preferred for utensils such as skewer 32 and rack 36. The cup 72 may be either plastic or metal. The various straps are conveniently canvas or synthetic fabrics, such as nylon webbing.

Solar tubes useful in the present invention have been commercially available for use in solar water heating systems. Tubes of the types shown in the aforementioned U.S. patents have been quite satisfactorily used in the device of the present invention. The tubes 6 may be of any convenient diameter and length, depending on what types of foods are to be cooked and whether the device is to be portable or fixed. In the tube-shaped devices the overall length will normally be about 12–60" (30–152 cm), and the inside diameter will be in the range of 1.5–6.0" (3.8–15 cm), although it will be recognized that longer or shorter, wider or narrower, devices may also be made. In a typical device of the type shown in FIGS. 1–3 the tube 6 was 1.6 (4.1 cm) I.D. and 2.0" (5.1 cm) O.D. and was 48" (122 cm) long. The housing 42 was 3.5" (8.9 cm) O.D. and 48" (122 cm) long. The entire assembly weighed less than 10 pounds (4.5 kg). The dome shaped embodiment may be of any convenient diameter, but will preferably be 8–24" (20–60 cm) in diameter if round. It will also be recognized that the "dome" shape may also be a semi-cylinder, so that the device 2 of FIG. 7 will represent an elongated device with a semi-cylindrical cover viewed from one end. In this case the length will be generally comparable to the lengths of the tubular embodiments. Other suitable shapes may also be used; for instance the tube 6 may have an oval, elliptical or even squarish cross-section as well as the circular cross-section illustrated.

The solar cooking device 2 of the present invention operates very efficiently to cook foods completely and conveniently. For instance, in a test a number of hot dogs were mounted on a skewer and inserted into the interior of the tubular device described in the preceding paragraph. The device was then exposed to mid-day sunlight in a Southern California locale and the hot dogs were cooked thoroughly in about twenty minutes.

It will be evident that there are numerous embodiments of this invention which, while not specifically described above, are clearly within the scope and spirit of the invention, and are intended to be included as part of the invention. The above description is therefore to be considered exemplary only, and the actual scope of the invention is to be determined solely from the appended claims.

I claim:

1. A food cooking or sterilization device which comprises:
   a heating chamber at least partially enclosed by a solar radiation concentrator comprising a wall formed of a generally parallel spaced apart pair of sheets comprising an outer sheet transparent or translucent to solar radiation and an inner sheet opaque to and adsorptive of solar radiation, said sheets sealed together at their edges to form an enclosed space therebetween, said enclosed space being partially evacuated;
   retention means for retaining food, liquid or an article within said chamber, said retention means being removable from said chamber;
   a casing attached to and surrounding said concentrator, with an aperture therein; and
   orientation means for maintaining said device in a position such that solar radiation can impinge on said concentrator through said aperture;
   whereby said solar radiation impinging on said concentrator through said aperture generates heat within said chamber in a quantity sufficient to cook said food or sterilize said liquid or article within said chamber.

2. A cooking device as in claim 1 further comprising a solar radiation absorptive coating on a surface of said inner wall facing said evacuated space.

3. A cooking device as in claim 1 further comprising transport means cooperating with said casing for movement of said device from place to place.

4. A cooking device as in claim 3 wherein said device is capable of being carried by a person and said transport means comprises handling means for permitting said person to carry said device.

5. A cooking device as in claim 1 further comprising a cover for covering said aperture.

6. A cooking device as in claim 5 wherein said cover comprises a removable portion of said casing.

7. A cooking device as in claim 1 wherein said concentrator comprises a tubular member.

8. A cooking device as in claim 7 wherein said concentrator comprises a tubular member having a circular, oval, elliptical or squarish cross-section.

9. A cooking device as in claim 8 wherein said concentrator is an elongated generally cylindrical tube closed at one axial end and open at the other axial end, said wall is generally annular, and said chamber comprises the interior of said tube formed by said annular wall.

10. A cooking device as in claim 8 wherein said support means comprises an elongated rod onto which said food to be cooked is placed, and said rod carrying said food is passable through said open end of said tube into said chamber, wherein said food is cooked when said device is exposed to solar radiation.

11. A cooking device as in claim 1 wherein said outer wall comprises a sheet of transparent glass or high temperature resistant plastic.

12. A cooking device as in claim 11 wherein said outer wall comprises a glass sheet.

13. A cooking device as in claim 11 wherein said outer wall comprises a sheet of high temperature resistant plastic.

14. A cooking device as in claim 13 wherein said plastic comprises polycarbonate or polysulfone plastic.

15. A cooking device as in claim 1 wherein said inner wall comprises metal, glass, ceramic or high temperature resistant plastic.

16. A cooking device as in claim 2 wherein said coating comprises dark colored paint, carbon black or dark colored ceramic.

17. A cooking device as in claim 1 wherein said chamber can be pressure sealed and said walls are capable of withstanding pressure generated within said sealed chamber during cooking of said food therein.

18. A method for cooking food utilizing solar radiation which comprises:
   providing a cooking chamber at least partially enclosed by a solar radiation concentrator comprising a wall formed of a generally parallel spaced apart pair of sheets comprising an outer sheet transparent or translucent to solar radiation and an inner sheet opaque to and adsorptive of solar radiation, said sheets sealed together at their edges to form an enclosed space therebetween, said enclosed space being partially evacuated;
   providing food support means for supporting food within said chamber, said food support means being removably disposed within said chamber;
   providing a casing attached to and surrounding said concentrator, with an aperture therein;
   providing orientation means for maintaining said device in a position such that solar radiation can impinge on said concentrator through said aperture;
   placing food to be cooked on said support within said chamber; and
   maintaining said alignment such that solar radiation can impinge on said concentrator through said aperture and for a period of time sufficient for said solar radiation impinging on said concentrator through said aperture to generate heat within said chamber in a quantity sufficient to cook said food supported on said support means within said chamber.

19. A method as in claim 18 further comprising providing means to transport said device from place to place.

20. A method as in claim 18 wherein said concentrator comprises a tubular member.

21. A method as in claim 20 wherein said concentrator comprises a tubular member having a circular, oval, elliptical or squarish cross-section.

22. A method as in claim 18 wherein said support means comprises an elongated rod onto which said food to be cooked is placed, said method further comprising passing said rod carrying said food through an open end of said tube into said chamber, and therein cooking said food by exposure of said device to said solar radiation.

23. A method as in claim 18 wherein said concentrator is mounted on a vehicle and said device is operated for cooking while said vehicle is stationary or in motion.

24. A method as in claim 18 further comprising
providing sealing means for maintaining elevated pressure within said chamber during said cooking.

25. A method as in claim 18 further comprising
providing reflective means adjacent said concentrator to increase the quantity of solar radiation impinging on said aperture.

26. A method for sterilization of a liquid or article utilizing solar radiation which comprises:
providing a chamber adapted to function in the manner of an autoclave and at least partially enclosed by a solar radiation concentrator comprising a wall formed of a generally parallel spaced apart pair of sheets comprising an outer sheet transparent or translucent to solar radiation and an inner sheet opaque to and adsorptive of solar radiation, said sheets sealed together at their edges to form an enclosed space therebetween, said enclosed space being partially evacuated;
providing retention means for retaining said liquid or article within said chamber;
providing a casing attached to and surrounding said concentrator, with an aperture therein;
providing orientation means for maintaining said device in a position such that solar radiation can impinge on said concentrator through said aperture;
placing said liquid or article to be sterilzed within said chamber; and
maintaining said alignment such that solar radiation can impinge on said concentrator through said aperture and for a period of time sufficient for said solar radiation impinging on said concentrator through said aperture to generate heat within said chamber in a quantity sufficient to sterilize said liquid or article within said chamber.

27. A method as in claim 26 further comprising providing means to transport said device from place to place.

28. A method as in claim 26 wherein said concentrator comprises a tubular member.

29. A method as in claim 28 wherein said concentrator comprises a tubular member having a circular, oval, elliptical or squarish cross-section.

30. A method as in claim 26 further comprising support means for supporting said article within said chamber.

31. A method as in claim 26 wherein said concentrator is mounted on a vehicle and said device is operated for sterilzation while said vehicle is stationary or in motion.

32. A method as in claim 26 further comprising
providing sealing means for maintaining elevated pressure within said chamber during said sterilization.

33. A method as in claim 26 further comprising
providing reflective means adjacent said concentrator to increase the quantity of solar radiation impinging on said aperture.

34. A method as in claim 26 wherein said article to be sterilized comprised a medical or dental instrument.

* * * * *